United States Patent
Ito et al.

(10) Patent No.: US 9,997,300 B2
(45) Date of Patent: Jun. 12, 2018

(54) CAPACITOR ELECTRODE AND CAPACITOR USING SAME

(71) Applicant: Panasonic Intellectual Property Management Co., Ltd., Osaka (JP)

(72) Inventors: Yasuyuki Ito, Osaka (JP); Hiroyuki Yanagisawa, Shiga (JP); Koichi Morikawa, Kyoto (JP); Eri Hirose, Kyoto (JP); Nao Matsumura, Osaka (JP); Mitsuhiro Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 15/202,584

(22) Filed: Jul. 6, 2016

(65) Prior Publication Data

US 2016/0314907 A1 Oct. 27, 2016

Related U.S. Application Data

(63) Continuation of application No. PCT/JP2015/000294, filed on Jan. 23, 2015.

(30) Foreign Application Priority Data

Jan. 23, 2014 (JP) .................. 2014-010024

(51) Int. Cl.
*H01G 11/26* (2013.01)
*H01G 11/28* (2013.01)
(Continued)

(52) U.S. Cl.
CPC .............. *H01G 11/26* (2013.01); *H01G 11/28* (2013.01); *H01G 11/38* (2013.01); *H01G 11/42* (2013.01); *H01G 11/68* (2013.01); *Y02E 60/13* (2013.01)

(58) Field of Classification Search
CPC ........ H01G 11/26; H01G 11/28; H01G 11/38; H01G 11/42; H01G 11/68; Y02E 60/13
See application file for complete search history.

(56) References Cited

U.S. PATENT DOCUMENTS

| 6,359,769 B1 | 3/2002 | Mushiake et al. |
| 2001/0012193 A1 | 8/2001 | Watanabe et al. |

(Continued)

FOREIGN PATENT DOCUMENTS

| JP | 3-240215 | 10/1991 |
| JP | 11-154630 | 6/1999 |

(Continued)

OTHER PUBLICATIONS

International Search Report of PCT application No. PCT/JP2015/000294 dated Apr. 21, 2015.

*Primary Examiner* — Dion R Ferguson
(74) *Attorney, Agent, or Firm* — McDermott Will & Emery LLP

(57) ABSTRACT

A capacitor electrode includes a substrate having electrical conductivity, a conductive layer formed on a surface of the substrate, and an electrode layer formed on the conductive layer. The electrode layer is allowed to adsorb and desorb ions on a surface thereof. The conductive layer contains flake graphite. A density of the conductive layer is greater than 1.1 g/cm$^3$. An average particle size $D_{50}$ of the flake graphite, which is measured by using a dynamic light scattering method, is less than or equal to 10 μm.

20 Claims, 1 Drawing Sheet

(51) Int. Cl.
    *H01G 11/68*    (2013.01)
    *H01G 11/38*    (2013.01)
    *H01G 11/42*    (2013.01)

(56) References Cited

U.S. PATENT DOCUMENTS

| | | |
|---|---|---|
| 2007/0177332 A1 | 8/2007 | Kobayashi et al. |
| 2013/0003260 A1 | 1/2013 | Kondou et al. |
| 2015/0086881 A1* | 3/2015 | Zhamu .................. H01G 11/68 429/405 |

FOREIGN PATENT DOCUMENTS

| | | |
|---|---|---|
| JP | 2001-216952 | 8/2001 |
| JP | 2005-136401 | 5/2005 |
| JP | 2011-228684 | 11/2011 |
| JP | 2012-084612 | 4/2012 |
| JP | 2012-156109 | 8/2012 |
| JP | 2012-227274 | 11/2012 |

* cited by examiner

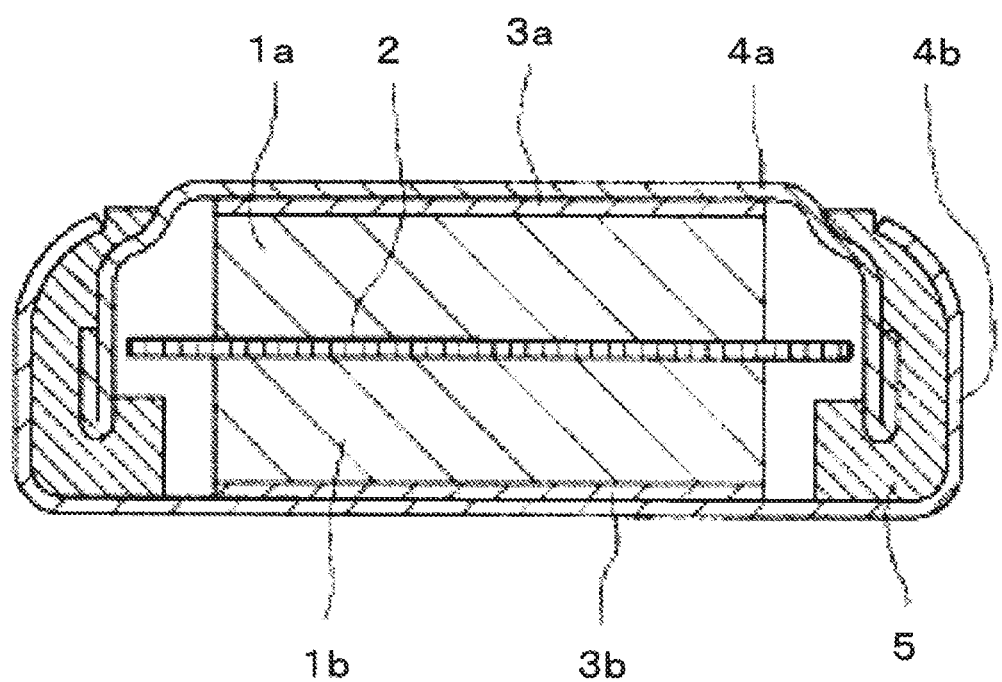

CAPACITOR ELECTRODE AND CAPACITOR USING SAME

RELATED APPLICATIONS

This application is a Continuation of International Application No. PCT/JP2015/000294, filed on Jan. 23, 2015, which in turn claims priority from Japanese Patent Application No. 2014-010024, filed on Jan. 23, 2014, the contents of all of which are incorporated herein by reference in their entireties.

BACKGROUND

1. Technical Field

The present disclosure relates to a capacitor electrode used for various electronic devices, electric appliances, industrial equipment, an automobile or the like, and a capacitor using the capacitor electrode.

2. Description of the Related Art

In recent years, an electric double layer capacitor has been developed as a storage device for the purpose of power assistance or a backup of electronic devices. Accordingly, in order to increase power density of an electric double layer capacitor, an internal resistance of the electric double layer capacitor needs to be reduced. As a method for reducing the internal resistance, it is necessary to reduce an interfacial resistance at a contact portion between a current collector and a polarizable electrode layer in a pair of positive and negative electrodes used in the electric double layer capacitor. As one means for reducing the interfacial resistance, it is proposed that a conductive layer having excellent electrical conductivity and adhesion properties is formed between the current collector and the polarizable electrode layer. The conductive layer is formed of carbon black having excellent electrical conductivity and binder having excellent adhesion properties. The conductive layer can reduce the interfacial resistance while increasing adhesion strength between the polarizable electrode layer and the current collector (see Unexamined Japanese Patent Publication No. 11-154630).

SUMMARY

A capacitor electrode of the present disclosure includes a substrate having electrical conductivity, a conductive layer formed on a surface of the substrate, and an electrode layer formed on the conductive layer. The electrode layer is allowed to adsorb and desorb ions on a surface thereof. The conductive layer includes flake graphite. A density of the conductive layer is greater than 1.1 g/cm$^3$. An average particle size $D_{50}$ of the flake graphite, which is measured by using a dynamic light scattering method, is less than or equal to 10 µm. Further, a capacitor of the present disclosure has a positive electrode and a negative electrode, and at least one of the positive and negative electrodes is formed of the above-mentioned capacitor electrode.

With the above configuration, the capacitor electrode and the capacitor of the present disclosure make it possible to prevent deterioration of charge and discharge characteristics that are caused when charging and discharging are repeated. This is because, since the conductive layer is configured to be densely filled with flake graphite, an electrolyte solution is prevented from permeating through the conductive layer and coming into contact with a surface of the substrate, so that the surface of the substrate is prevented from corroding.

BRIEF DESCRIPTION OF THE DRAWINGS

FIGURE is a schematic sectional view showing a configuration of a capacitor in an exemplary embodiment.

DETAILED DESCRIPTION OF EMBODIMENT

Before describing an exemplary embodiment of the present disclosure, problems of the conventional electric double layer capacitor will be described. The electric double layer capacitor using an electrode provided with a conductive layer, which is disclosed in Unexamined Japanese Patent Publication No. 11-154630, can reduce an interfacial resistance between a polarizable electrode layer and a current collector, and also can reduce resistance as a capacitor.

However, as a power storage device, the electric double layer capacitor is needed not only to improve short-term charge and discharge characteristics, but also to prevent deterioration of the characteristics when charging and discharging are repeated.

The present disclosure provides a capacitor electrode capable of preventing deterioration of long-term charge and discharge characteristics, and a capacitor using the capacitor electrode.

Hereinafter, an exemplary embodiment of the present disclosure will be described with reference to the drawings, but the configuration of the present disclosure is not limited to the contents of the following description.

Exemplary Embodiment

FIGURE is a schematic sectional view showing a configuration of a capacitor in an exemplary embodiment of the present disclosure.

As shown in FIGURE, a capacitor of the present exemplary embodiment includes: upper case 4a and lower case 4b that are disposed to face each other; conductive layer 3a and conductive layer 3b that are respectively formed on a surface of case 4a and a surface of case 4b which face each other; electrode layer 1a and electrode layer 1b that are respectively formed on a surface of conductive layer 3a and a surface of conductive layer 3b; and separator 2 disposed between electrode layer 1a and electrode layer 1b. Electrode layer 1a and electrode layer 1b face each other with separator 2 interposed therebetween. Further, an electrolyte solution (not shown) is impregnated into separator 2, electrode layer 1a, and electrode layer 1b. Furthermore, between an external side surface of case 4a and an internal side surface of case 4b, insulating member 5 for insulating case 4a and case 4b is interposed. Insulating member 5 is disposed to enclose a laminated body in which conductive layer 3b, electrode layer 1b, separator 2, electrode layer 1a, and conductive layer 3a are laminated in this order.

Electrode layer 1a and electrode layer 1b each have a disk-like shape with a diameter of approximately 4.0 mm and a thickness of approximately 1.0 mm. Further, both electrode layer 1a and electrode layer 1b contain activated carbon. As the activated carbon, for example, phenolic resin-based activated carbon with an average particle size of 5 µm is employed. Furthermore, other than the activated carbon, electrode layer 1a and electrode layer 1b of the present exemplary embodiment contain binder, a dispersing agent, and an electro-conductive material. As the binder, polytetrafluoroethylene is employed, as an example. As the dispersing agent, carboxymethyl cellulose is employed. As the electro-conductive material, acetylene black with an average particle size of 30 nm is employed, as an example.

Electrode layer 1a and electrode layer 1b of the present exemplary embodiment are configured such that a weight ratio of the activated carbon:the electro-conductive material:the binder is 8:1:1. As an example, in electrode layer 1a and electrode layer 1b of the present exemplary embodiment, electrode layer 1b constitutes a positive electrode, and electrode layer 1a constitutes a negative electrode. However, since an external circuit connection method may invert a positional relation between the positive electrode and the negative electrode, polarities of electrode layer 1a and electrode layer 1b are not limited in the capacitor of the present disclosure.

Separator 2 is formed of a porous sheet. As an example, a porous sheet made of polypropylene with a thickness of 170 μm and a density of 0.50 g/cm$^3$ is used. To prevent a short circuit, separator 2, which is in direct contact with electrode layer 1a and electrode layer 1b, is disposed to be interposed between electrode layer 1a and electrode layer 1b.

Conductive layer 3a and conductive layer 3b each have a disk-like shape with diameters of 9 mm to 12 mm and a thickness of approximately 10 μm. Further, conductive layer 3a and conductive layer 3b each have a density of 1.25 g/cm$^3$. Conductive layer 3a and conductive layer 3b of the present exemplary embodiment contain an electro-conductive material and binder. As the electro-conductive material, flake graphite with an average particle size $D_{50}$ of 0.75 μm, which is measured by using a dynamic light scattering method, is employed. As the binder, carboxymethyl cellulose is employed. Then, conductive layer 3a and conductive layer 3b of the present exemplary embodiment are configured such that a weight ratio of the electro-conductive material:the binder is 5:1. Conductive layer 3a and conductive layer 3b of the present exemplary embodiment are fabricated such that flake graphite, binder, and a dispersion agent are mixed with water to prepare a paste, and the paste is applied on the respective surfaces of case 4a and case 4b and then dried, for example.

Upper case 4a and lower case 4b are obtained by processing a stainless steel plate with a thickness of approximately 0.30 μm. In the present exemplary embodiment, conductive layer 3a and conductive layer 3b are respectively formed on a surface of case 4a and a surface of case 4b which face each other, and electrode layer 1a and electrode layer 1b are respectively formed on conductive layer 3a and conductive layer 3b. In this case, electrode layer 1a and electrode layer 1b are configured to face each other with separator 2 interposed therebetween. Then, end portions (outer peripheral portion) of case 4a and case 4b, which are located in the outer periphery of an area in which conductive layer 3a, conductive layer 3b, electrode layer 1a, and electrode layer 1b are formed, are crimped to seal thereinside in the state where insulating member 5 is interposed between an outer peripheral portion of case 4a and an outer peripheral portion of case 4b. Note that, insulating member 5 of the present exemplary embodiment, which has an annular shape, is configured to include electrode layer 1a, electrode layer 1b, and separator 2 inside the ring of insulating member 5. As an example, insulating member 5 is made of an annular body formed of polypropylene, and an isobutylene-isoprene rubber with which a surface of the annular body is coated. Case 4a and case 4b, which are sealed with the above configuration, form a coin-type case. At that time, in the capacitor of the exemplary embodiment, case 4a and case 4b are formed of an electro-conductive material like the above stainless steel plate, and conductive layer 3a, conductive layer 3b, electrode layer 1a, and electrode layer 1b are formed (laminated) on the surfaces of case 4a and case 4b. Thus, electrode layer 1a is configured to be electrically connected to case 4a via conductive layer 3a, and electrode layer 1b is configured to be electrically connected to case 4b via conductive layer 3b. Therefore, case 4a and case 4b of the present exemplary embodiment function as an outer package for accommodating electrode layer 1a, electrode layer 1b, separator 2, conductive layer 3a, conductive layer 3b, and an electrolyte solution. At the same time, case 4a and case 4b are electrically connected to electrode layer 1a and electrode layer 1b, thereby functioning as a substrate and an outer electrode for drawing the positive and negative electrodes from the inside of case 4a and case 4b to the outside.

As for the electrolyte solution impregnated into electrode layer 1a, electrode layer 1b, and separator 2, γ-butyrolactone is used as a solvent, and tetraethylammonium tetrafluoroborate ($TEA^+BF_4^-$) is used as a solute. Its concentration is 1.0 M, as an example.

The capacitor of the present exemplary embodiment is configured as described above.

In the capacitor electrode and the capacitor of the present disclosure, the conductive layer contains flake graphite. The flake graphite is characterized to have an average particle size $D_{50}$ of 10 μm or less when measured by using a dynamic light scattering method.

With this configuration, the capacitor electrode and the capacitor can prevent deterioration of charge and discharge characteristics when charging and discharging are repeated. This is because the above configuration makes it possible to improve dispersibility of the flake graphite in the conductive layer and prevent the flake graphite from dispersing unevenly in the conductive layer. Further, in addition to this, the above configuration can easily fill a gap between flakes of graphite in the conductive layer, and makes it easy to increase a filling ratio of flake graphite, thereby making it possible to form a denser film as a conductive layer.

The flake graphite used for the conductive layer of the present disclosure has a sheet-like or plate-like shape, i.e., when a size of graphite is three-dimensionally defined by using x-axis, y-axis, and z-axis, one dimension of the size in one axis, among the three axes, is significantly smaller than the other dimensions of the size in the remaining two axes. Further, it is confirmed, from the magnitude of oil absorption, that lipophilicity is increased as compared with the conventional granular graphite having a more spherical shape.

Note that, in the present disclosure, an average particle size $D_{50}$ representing a size of flake graphite is obtained as follows: in the case where flake graphite that is not yet aligned and divided into a myriad of individual pieces is used as a sample, the individual pieces each are measured independent of which axis directional dimension is selected among the three axis directional dimensions, and an average particle size $D_{50}$ is evaluated from the distribution thereof. As an example of specific measuring methods, a prefabricated conductive layer is diluted 1,000 fold (weight ratio) with water and then the diluted solution is stirred for 5 minutes. After that, a zeta potential particle size measuring system (Otsuka Electronics Co. Ltd.: ELS-Z2) is used to measure an average particle size $D_{50}$ based on a dynamic light scattering method (in accordance with JIS Z 8826: 2005). In this case, all the flakes of graphite serving as a sample are categorized into two groups. Assumed that a border is determined to have a certain value of particle size, one group is defined to have a particle size greater than that of the border. The other group is defined to have a particle size smaller than that of the border. If the border is determined such that the above two group has the same amount of flakes of graphite, the certain value of particle size is defined as an average particle size "$D_{50}$." Note that, in the present disclosure, a size of flake graphite is often expressed by "particle size" for convenience, but this expression does not intend that flake graphite is interpreted to have a shape of "particle", which means a substantially spherical shape. Further, to specify a configuration of the present disclosure, the average particle size $D_{50}$ of flake graphite has a numerical range whose upper limit is only defined. This is because the expression is based on such a consideration that all the flakes of graphite having an average particle size $D_{50}$ less than the upper limit may obtain a similar effect, and the defined matters are represented concisely. However, strictly speaking, the flakes of graphite used in the conductive layer of the present disclosure are practically impossible to have an average particle size $D_{50}$ of 0 μm or less. Therefore, it is more preferable that a definition of "greater than 0 μm" is further provided as a lower limit.

Furthermore, in terms of using such flakes of graphite having small size particles, the conductive layer of the present disclosure preferably has a density of greater than 1.2 g/cm$^3$.

With this configuration, the capacitor electrode and the capacitor of the present disclosure further reduce a degradation rate of charge and discharge characteristics when the capacitor is charged and discharged repeatedly, thereby achieving a longer life. In the case where the above flake graphite is used as an electro-conductive material, when a density of the conductive layer is increased, a region in which the surface of the case is coated with the flake graphite increases as compared with a conductive layer using a more spherical carbon material such as carbon black. In addition to this, inside the conductive layer, a region in which the flake graphite is spread densely is increased. Thus, the densely spread region further prevents an electrolyte solution (especially, organic electrolyte solution) from permeating through the conductive layer, so that the electrolyte solution permeated through the conductive layer is avoided from being in contact with the case, thereby preventing corrosion of the case. Thus, a life of the capacitor electrode and the capacitor can be improved.

For a density of the conductive layer, a numerical range is defined, but an upper limit is not provided particularly. This is because, from a viewpoint of the mechanism of the present disclosure, electrolyte solution is supposed to be prevented from permeating through the conductive layer, if flake graphite is spread more densely in the conductive layer.

Furthermore, when the conductive layer of the present disclosure is formed on a substrate, the conductive layer is preferably heat-treated at a temperature from 175° C. to 225° C. inclusive. This treatment makes it possible to remove more impurities contained in the conductive layer, thereby preventing corrosion of the substrate that is electrically connected to the conductive layer. Furthermore, the binder contained in the conductive layer of the present disclosure can be reformed, so that adhesion strength of the conductive layer is improved. With this heat treatment, the conductive layer of the present disclosure makes it possible to remove impurities, which the conventional drying method fails to remove sufficiently. This prevents a reaction occurring between the impurities, the electrolyte solution, and the substrate connected to the conductive layer, so that corrosion of the substrate is prevented. Thus, the capacitor using the conductive layer of the present disclosure makes it possible to prevent deterioration of charge and discharge characteristics. Note that, in the present disclosure, if the conductive layer is formed through the paste fabrication as described above, drying may be performed as the above-mentioned heat treatment.

As a method for confirming that the heat treatment improves adhesion properties of the conductive layer, the following method is employed, for example. That is, the reformed conductive layer adhered to the substrate is subjected to ultrasonic treatment, and after the ultrasonic treatment, an amount of the remaining conductive layer without peeling from the substrate is measured.

Hereinafter, the ultrasonic treatment method will be described as an example. Five laminated bodies of a disk like shape with a diameter of 9 mm, which are formed of a stainless steel plate constituting the conductive layer and the case, are accommodated in a container as a sample. Water is poured into the container such that the above sample is fully immersed. Herein, the above five laminated bodies employed as a sample are fabricated in the same condition. The container is placed in a cleaning tank included in an ultrasonic cleaner. Then, water is poured into the cleaning tank such that the container is not floated from a bottom of the cleaning tank to the extent, and then ultrasonic treatment is performed. In this case, as an ultrasonic treatment condition, the ultrasonic treatment is performed at an ultrasonic output of 130 W and an oscillation frequency of 42 kHz for 1 min.

Hereinafter, a method for measuring an area of each conductive layer that remains after the ultrasonic treatment will be described as an example. By using an image sensor (KEYENCE Corp.: CV-3000), images of the conductive layer that is captured from a camera provided in the image sensor are converted into two types of pixels, i.e., black and white pixels (binary image processing), and an amount of each of the two types of pixels is counted. For five conductive layers each of which the amount of pixels is measured, quantified values of the area are averaged, and a ratio of the averaged value to a value of the area before the ultrasonic treatment is calculated.

For the conductive layer of the present disclosure subjected to the above heat treatment, a ratio (area ratio) of a value of the area of the conductive layer that remains after the ultrasonic treatment to a value of the area of the conductive layer before the ultrasonic treatment is more than or equal to 0.3. A large value in the above-mentioned area ratio of the conductive layer means that the conductive layer has high adhesion strength with respect to the substrate. More preferably, the above-mentioned area ratio of the conductive layer is more than or equal to 0.8. Thus, by performing the heat treatment, the conductive layer of the present disclosure makes it possible to obtain high adhesion strength with respect to the substrate. Note that, an upper limit of the area ratio is 1.0, which is a value in the state where the conductive layer is not peeled off at all.

To achieve the reforming of binder as described above, carboxymethyl cellulose group is preferably suitable for the binder used in the conductive layer of the present disclosure. This reason is as follows. The carboxymethyl cellulose has a solubility parameter (sp value) of 15.6, which indicates the degree of affinity for a solvent which is used as an electrolyte solution or the like. This lowers the affinity for the solvent serving as an electrolyte solution (14.2 or less), so that the electrolyte solution is difficult to invade inside the conductive layer. As a result, the substrate on which the conductive layer is formed is further prevented from corroding. Thus, in the binder, which is used in the conductive layer of the present disclosure, and the electrolyte solution, an absolute differential value of the above-mentioned sp value is preferably more than or equal to 1. Furthermore, when heat treatment of the binder consisting of carboxymethyl cellulose is performed, the carboxymethyl cellulose forms a film. Therefore, it is believed that the adhesion strength is especially improved as the conductive layer. If only carboxymethyl cellulose is used as binder to form the conductive layer, a weight ratio of flake graphite to binder (weight of flake graphite:weight of a binder) ranging from 3:1 to 9:1 may preferably be used.

Furthermore, in the capacitor using the conductive layer of the present disclosure, in the case where substrates such as case 4a and case 4B each having the conductive layer formed on the surface thereof are formed of a stainless steel plate irrespective of a positive electrode or a negative electrode, the substrate of the positive electrode preferably contains an amount of molybdenum larger than that of the substrate of the negative electrode. This configuration makes it possible to prevent deterioration of the capacitor effectively in the case where the capacitor is charged and discharged. This is because corrosion of the substrate occurs preferentially on a positive electrode side when the substrate is brought into contact with the electrolyte solution to cause conductivity. If the substrate of the positive electrode contains an amount of molybdenum larger than that of the substrate of the negative electrode, resistance to corrosion will be improved as a stainless steel material, thereby making it possible to prevent deterioration of charge and discharge characteristics as a capacitor. In other words, for the substrate of the negative electrode in which corrosion is prevented as compared with the positive electrode, the degree of freedom in material selection is increased, thereby making it possible to use a substrate made of a less expensive stainless steel plate. Therefore, a capacitor with an excellent productivity can be manufactured. Note that, as a component contained in the substrate of the positive electrode to improve resistance to corrosion, chromium, tungsten, nitrogen (nitride) and the like may be employed other than molybdenum.

(Performance Evaluation Test)

Performance evaluation tests were carried out for a capacitor using conductive layers of samples A to H, which include the conductive layer of the present disclosure. Hereinafter, the performance evaluation tests will be described.

In samples A to H, Table 1 shows aging test results for each of capacitors in which the conductive layers of the respective samples were used. Note that, each of the capacitors in which the conductive layers of the respective samples were used had the same configuration except for the conductive layer, i.e., the configuration other than the conductive layer was the same as that of the capacitor in the above exemplary embodiment.

In each of the conductive layers of samples A to C, flake graphite having the respective values of average particle size $D_{50}$ shown in Table 1, which was measured by using a dynamic light scattering method, was used and carboxymethyl cellulose was used as binder. Further, a weight ratio of flake graphite to binder (weight of flake graphite:weight of binder) was 5:1. After the conductive layer was formed on the surface of the substrate, heat treatment was performed at 200° C. for 10 min.

In each of the conductive layers of samples D to H, flake graphite or granular graphite having the respective values of average particle size $D_{50}$ shown in Table 1, which was measured by using a dynamic light scattering method, was used and acrylic resin was used as binder. Further, a weight ratio of flake graphite or granular graphite to binder (weight of flake graphite or granular graphite:weight of binder) was 7:1. After the conductive layer was formed on the surface of the substrate, heat treatment was performed at 85° C. for 10 min.

A configuration of the capacitor used in this test was a coin-type capacitor whose size had a diameter of 9 mm. In this test, as a load condition with respect to the capacitor, a voltage of 2.8V was continued to be applied for 1000 hours under an environment of 70° C. Then, to evaluate the degree of deterioration of each capacitor, resistance values of the capacitor before and after the test were measured, and a ratio of the resistance value after the test to the resistance value before the test was expressed as a percentage. In this case, in order to calculate the above ratio, an LCR meter was used to evaluate each of the resistance values before and after the test from 1 kHz impedance.

TABLE 1

| Sample name | Average particle size $D_{50}$ μm | Graphite type | Density g/cm³ | Resistance change ratio % |
|---|---|---|---|---|
| Sample A | 0.5 | Flake graphite | 1.26 | 700 |
| Sample B | 0.75 | Flake graphite | 1.25 | 700 |
| Sample C | 1 | Flake graphite | 1.21 | 700 |
| Sample D | 2.5 | Flake graphite | 1.12 | 920 |
| Sample E | 10 | Flake graphite | 1.11 | 960 |
| Sample F | 15 | Flake graphite | 1.05 | 2720 |
| Sample G | 5 | Granular graphite | 1.02 | 5080 |
| Sample H | 35 | Flake graphite | 0.95 | 4400 |

As shown in Table 1, samples A to E having an average particle size $D_{50}$ of 10 μm or less stably prevent deterioration of the resistance (rise in the resistance value after the test). On the contrary, samples F to H having an average particle size $D_{50}$ of more than 10 μm significantly deteriorate the resistance as compared with samples A to E. Furthermore, among samples A to E corresponding to the present exemplary embodiment, samples A to C, which have an average particle size $D_{50}$ of 1 μm or less and a high density of greater than 1.2 g/cm³, especially prevent deterioration of the resistance.

Subsequently, to confirm an effect of the heat treatment performed with respect to the conductive layer of the present disclosure, the following tests were carried out.

Conductive layers were subjected to the above heat treatment under different temperature conditions and the above ultrasonic treatment was performed to examine a relationship between area ratios of the conductive layers. The result is shown in Table 2. Note that, a configuration of the samples used in this test was the same as those of the conductive layer and the substrate (case 4b) in the capacitor of sample B, except for heat treatment conditions. This test employed such a heat treatment condition that the samples were heated for 10 min at the respective heat temperatures.

TABLE 2

| Heat temperature ° C. | Area ratio |
|---|---|
| 85 | 0.005 |
| 130 | 0.005 |
| 160 | 0.005 |
| 180 | 0.36 |
| 190 | 0.91 |

TABLE 2-continued

| Heat temperature ° C. | Area ratio |
|---|---|
| 200 | 0.87 |
| 210 | 0.93 |

Table 2 shows that, in the conductive layer heated at a temperature of 180° C. or more, the remaining amount after the ultrasonic treatment is significantly improved (the area ratio is increased) as compared with the conductive layer heated at a temperature of less than 180° C., so that adhesion strength is improved. This shows that, if the conductive layer is subjected to the heat treatment, the conductive layer has such adhesion strength that the conductive layer can remain, i.e., an area ratio before and after the ultrasonic treatment is more than or equal to 0.3. Further, in the conductive layer of the present disclosure, an area of the remaining conductive layer is significantly increased when the heat treatment is performed at a temperature of 190° C. or more and particularly, excellent adhesion strength is obtained.

Note that, the capacitor of the present exemplary embodiment is described by using a configuration of the capacitor using a coin-type case, but the capacitor of the present disclosure is not limited to this structure. Other than the coin-type case, an outer package made of a laminate film formed by laminating resin layers and metal layers, an outer package composed of a bottomed cylindrical case, an outer package composed of a cylindrical case, or an outer package made of only a resin may also be used as the capacitor of the present disclosure. Further, in the capacitor electrode of the present exemplary embodiment, the conductive layer is configured to be electrically connected in direct contact with the case, but the capacitor electrode of the present disclosure is not limited to this configuration. Apart from the above case, a conductive substrate (current collector) in contact with the above-mentioned conductive layer may be provided to draw an electrode from the electrode layer via the conductive layer. The current collector is preferably formed of at least one material of aluminum, copper, nickel, titanium, iron, stainless steel, and carbon material. Furthermore, the current collector preferably has a sheet shape.

The capacitor electrode in the present disclosure and the capacitor using the capacitor electrode are improved in long-term degradation of characteristics, and a long life is achieved as a capacitor. Thus, it is expected that the capacitor electrode in the present disclosure and the capacitor using the capacitor electrode are used in automobiles and electronic devices, which are required for high reliability.

What is claimed is:
1. A capacitor comprising:
a positive electrode; and
a negative electrode,
wherein each of the positive electrode and the negative electrode includes:
a substrate having electrical conductivity;
a conductive layer formed on a surface of the substrate; and
an electrode layer formed on the conductive layer, the electrode layer being allowed to adsorb and desorb ions on a surface of the electrode layer,
the conductive layer includes flake graphite,
a density of the conductive layer is greater than 1.1 g/cm$^3$,
an average particle size $D_{50}$ of the flake graphite, which is measured by using a dynamic light scattering method, is less than or equal to 10 μm,
both the substrate of the positive electrode and the substrate of the negative electrode are made of stainless steel, and
the substrate of the positive electrode contains any one of chromium, molybdenum, tungsten, and nitrogen whose amount is larger than that of the substrate of the negative electrode.

2. The capacitor according to claim 1, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

3. The capacitor according to claim 1, wherein the average particle size $D_{50}$ of the flake graphite, which is measured by using a dynamic light scattering method, is less than or equal to 1 μm.

4. The capacitor according to claim 1, wherein the density of the conductive layer is greater than 1.2 g/cm$^3$.

5. The capacitor according to claim 1, wherein:
the conductive layer includes binder, and
the binder is made of only a cellulosic compound.

6. A capacitor comprising:
a positive electrode; and
a negative electrode,
wherein each of the positive electrode and the negative electrode includes:
a substrate having electrical conductivity;
a conductive layer formed on a surface of the substrate; and
an electrode layer formed on the conductive layer, the electrode layer being allowed to adsorb and desorb ions on a surface of the electrode layer,
both the substrate of the positive electrode and the substrate of the negative electrode are made of stainless steel, and
the substrate of the positive electrode contains any one of chromium, molybdenum, tungsten, and nitrogen whose amount is larger than that of the substrate of the negative electrode.

7. The capacitor according to claim 6, wherein the conductive layer includes flake graphite.

8. The capacitor according to claim 7, wherein the conductive layer further includes binder made of a cellulosic compound.

9. The capacitor according to claim 7, wherein a density of the conductive layer is greater than 1.1 g/cm$^3$.

10. The capacitor according to claim 8, wherein a density of the conductive layer is greater than 1.1 g/cm$^3$.

11. The capacitor according to claim 7, wherein an average particle size $D_{50}$ of the flake graphite, which is measured by using a dynamic light scattering method, is less than or equal to 10 μm.

12. The capacitor according to claim 8, wherein an average particle size $D_{50}$ of the flake graphite, which is measured by using a dynamic light scattering method, is less than or equal to 10 μm.

13. The capacitor according to claim 10, wherein an average particle size $D_{50}$ of the flake graphite, which is measured by using a dynamic light scattering method, is less than or equal to 10 μm.

14. The capacitor according to claim 7, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

15. The capacitor according to claim 8, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

16. The capacitor according to claim 9, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

17. The capacitor according to claim 10, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

18. The capacitor according to claim 11, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

19. The capacitor according to claim 12, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

20. The capacitor according to claim 13, wherein
when ultrasonic treatment is performed with respect to the conductive layer under an ultrasonic treatment condition, a ratio of an area of the conductive layer after the ultrasonic treatment to an area of the conductive layer before the ultrasonic treatment is more than or equal to 0.3 and less than or equal to 1.0, the ultrasonic treatment condition being a condition in which a disk-shaped laminated body having a diameter of 9 mm and made of the substrate and the conductive layer is subjected to the ultrasonic treatment for 1 min at an ultrasonic output of 130 W and an oscillation frequency of 42 kHz in an ultrasonic cleaner.

* * * * *